(12) United States Patent
Huffman

(10) Patent No.: US 10,870,157 B2
(45) Date of Patent: Dec. 22, 2020

(54) PILOT DRILL WITH SPRING DETENT

(71) Applicant: Mueller International, LLC, Atlanta, GA (US)

(72) Inventor: Jeffrey Allen Huffman, Monticello, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 16/421,537

(22) Filed: May 24, 2019

(65) Prior Publication Data

US 2020/0368828 A1    Nov. 26, 2020

(51) Int. Cl.
*B23B 51/04* (2006.01)
*B23B 31/113* (2006.01)

(52) U.S. Cl.
CPC ........ *B23B 51/0433* (2013.01); *B23B 31/113* (2013.01)

(58) Field of Classification Search
CPC .............. B23B 51/044; B23B 51/0446; B23B 51/0426; B23B 51/0433; B23B 51/0453; B23B 51/046
See application file for complete search history.

(56) References Cited

U.S. PATENT DOCUMENTS

| | | | | |
|---|---|---|---|---|
| 438,740 A | * | 10/1890 | Eley | F16L 55/105 137/15.09 |
| 485,715 A | * | 11/1892 | Smith | B23B 51/044 408/67 |
| 1,045,289 A | * | 11/1912 | Hill | B23B 51/05 408/86 |
| 2,601,434 A | * | 6/1952 | Du Bois | F16L 41/04 137/318 |
| 2,800,812 A | * | 7/1957 | Mueller | B23B 51/044 408/67 |
| 4,279,551 A | * | 7/1981 | Wilterding | B23B 51/0426 408/207 |
| 7,438,509 B1 | * | 10/2008 | Wong | B23B 51/044 408/204 |
| 2006/0188349 A1 | * | 8/2006 | Weiler | B23B 51/044 408/67 |

(Continued)

OTHER PUBLICATIONS

Mueller Co; Installation Instructions for Mueller Inserting Valves, revised Jun. 1972, 16 pgs.

(Continued)

*Primary Examiner* — Alan Snyder
(74) *Attorney, Agent, or Firm* — Taylor English Duma LLP

(57) ABSTRACT

A pilot drill includes a shaft defining a detent cavity extending from an outer surface of the shaft towards a longitudinal axis of the shaft, the shaft comprising a cutting edge positioned proximate to the outer surface, the shaft configured to rotate about the longitudinal axis during use; and a detent including: a bar positioned at least partly within the detent cavity, the bar including a base and an ear and defining an opening extending from the first side to the second side proximate to the leading end; a fastener extending through the fastener bore of the shaft and the opening of the bar and defining a pivot axis, the bar configured to rotate about the pivot axis from a disengaged position to an engaged position, the ear of the bar extending past the outer surface of the shaft when the bar is in the engaged position.

26 Claims, 10 Drawing Sheets

(56) References Cited

U.S. PATENT DOCUMENTS

2007/0297867 A1* 12/2007 Weiler .................. B23B 51/044
                                                              408/67

OTHER PUBLICATIONS

Mueller Co; Catalog for Mueller Large Drilling Machines, publicly available prior to one year before May 24, 2019, 54 pages.
Mueller Co; Drawings of a pilot drill for a pipe cutting tool, publicly available prior to one year before May 24, 2019, 1 pg.

* cited by examiner

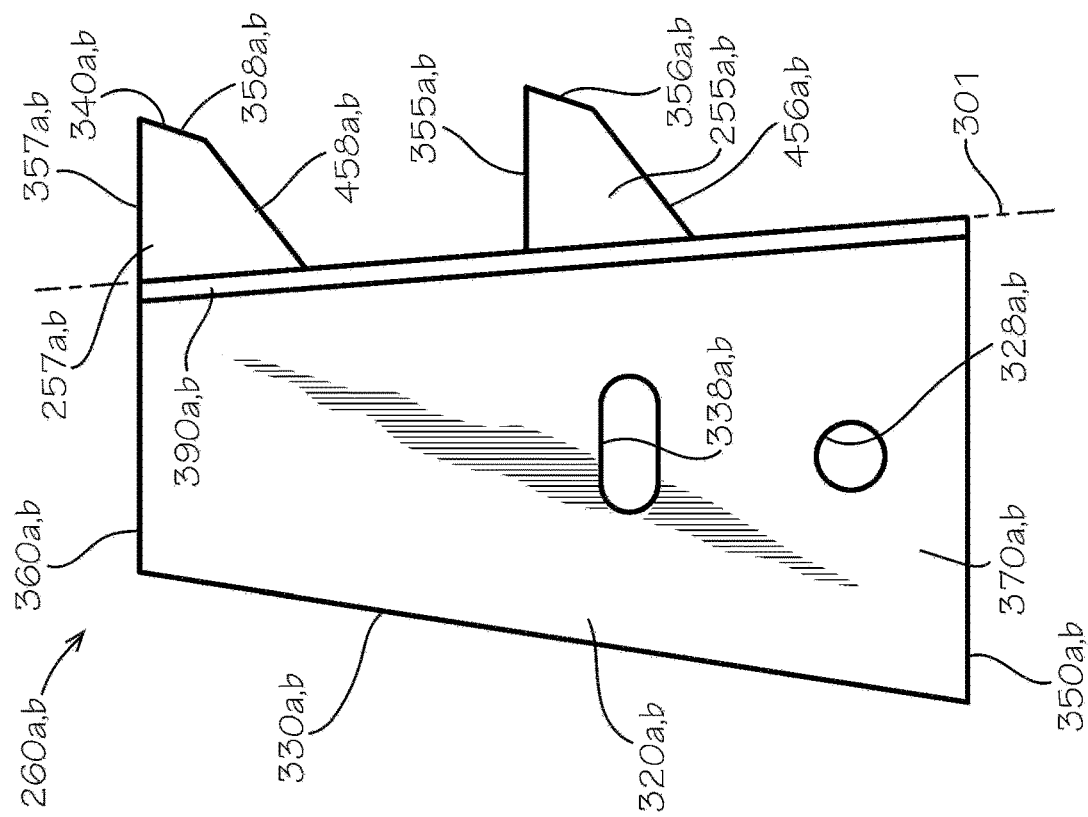
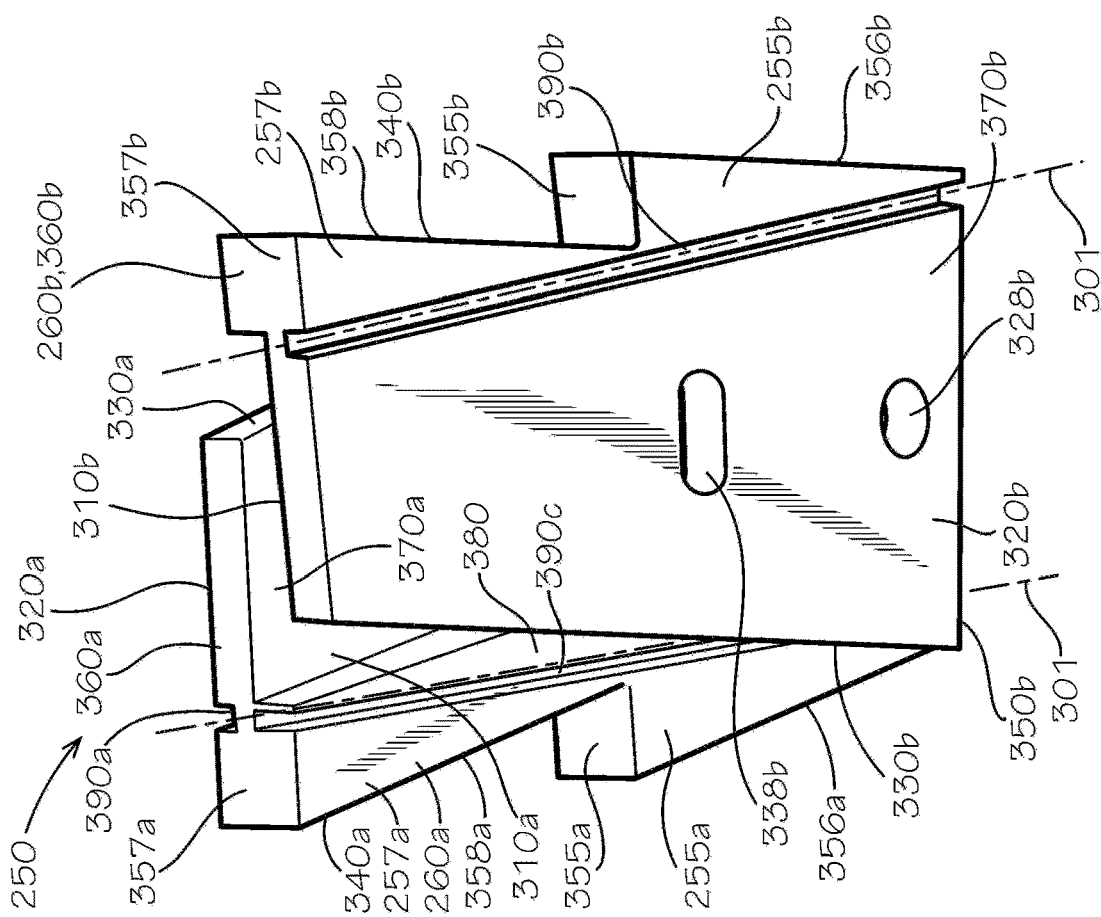
FIG. 4
FIG. 3

PILOT DRILL WITH SPRING DETENT

TECHNICAL FIELD

Field of Use

This disclosure relates to tools for cutting through walls of pipes. More specifically, this disclosure relates to pilot drills with detents for use with shell cutters.

Related Art

Drilling a hole in one side of a wall of an already formed pipe or completely through the pipe can be either beneficial or necessary. Pipes—especially long pipes—can be made from a process that results in each having a continuously solid wall such that any holes must typically be formed later. Such a hole, once formed, can be used to tap into a pipeline such as to attach a branch pipe or a fitting and/or allow the insertion of a pipeline plug.

In some aspects, the hole can be of such a small diameter that a solid drill bit can be used to form the hole. In other aspects, the hole can be of a larger diameter requiring a shell cutter defining a cutter wall and guided by a pilot drill to prevent the shell cutter from "walking" across the round surface of the pipe. The pilot drill can first drill a pilot hole, and the pilot drill can then guide the movement of the shell cutter through a larger surrounding portion of the pipe wall. Upon cutting through the wall of the pipe, a pipe "coupon" can remain, which will generally need to be removed so as not to block the pipe or cause blockage or damage downstream from the pipe. Occasionally, the shell cutter and drill might not be able to finish fully cutting out the pipe coupon. For example, problems with a motor running the drill might require the cutter and drill to stop cutting and be removed partway through the process, meaning that the pipe coupon is not fully formed and therefore cannot be removed.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a pilot drill comprising: a shaft defining a longitudinal axis, the shaft further defining a detent cavity extending from an outer surface of the shaft towards the longitudinal axis and a fastener bore angled with respect to an extension direction of the detent cavity, the shaft comprising a cutting edge positioned proximate to the outer surface, the shaft configured to rotate about the longitudinal axis during use and thereby cut through a wall of a pipe; and a detent comprising: a bar positioned at least partly within the detent cavity, the bar comprising a base and an ear and defining an opening extending from the first side to the second side proximate to the leading end; a fastener extending through the fastener bore of the shaft and the opening of the bar and defining a pivot axis, the bar configured to rotate about the pivot axis from a disengaged position to an engaged position, the ear of the bar extending past the outer surface of the shaft with respect to the longitudinal axis when the bar is in the engaged position.

In a further aspect, disclosed is a drilling apparatus comprising: a pilot drill comprising: a shaft defining a longitudinal axis, the shaft further defining a detent cavity extending from an outer surface of the shaft towards the longitudinal axis and a fastener bore angled with respect to an extension direction of the detent cavity, the shaft comprising a cutting edge positioned proximate to the outer surface, the shaft configured to rotate about the longitudinal axis during use and thereby cut through a wall of a pipe; and a detent comprising: a bar positioned at least partly within the detent cavity, the bar comprising a base and an ear and defining a leading end and a trailing end distal from the leading end, and an opening extending from the first side to the second side proximate to the leading end; a fastener extending through the fastener bore of the shaft and the opening of the bar and defining a pivot axis, the bar configured to rotate about the pivot axis from a disengaged position to an engaged position, the ear extending past the outer surface of the shaft with respect to the longitudinal axis when the bar is in the engaged position, the ear defining a barbed shape; and a shell cutter secured to and fixed with respect to the pilot drill, the shell cutter defining a leading end, a trailing end, and a wall; an inner surface of the wall being offset from the outer surface of the shaft, the shell cutter configured to rotate together with the pilot drill about the longitudinal axis during use and thereby also cut through the wall of the pipe, a leading end of the shell cutter offset in an axial direction behind a tip of the pilot drill.

In yet another aspect, disclosed is a method of using a drilling apparatus, the method comprising: rotating the drilling apparatus about a longitudinal axis of a shaft of a pilot drill of the drilling apparatus, the drilling apparatus comprising the pilot drill, the pilot drill comprising the shaft and a detent, the detent comprising a bar positioned at least partly within a detent cavity defined in the shaft, the bar configured to rotate about a pivot axis of the pilot drill from a disengaged position to an engaged position, the bar further defining a base and an ear, the ear extending past the outer surface of the shaft with respect to the axis when the bar is in the engaged position, the ear defining a barbed shape beyond the outer surface of the shaft; forming a pilot hole in the wall of a pipe with the pilot drill; passing the detent of the pilot drill through the wall of the pipe with the detent in the disengaged position; and removing a cut pipe coupon of the pipe from the pipe with the detent in the engaged position by moving the drill apparatus in a direction opposite the cutting direction, a biasing element moving the detent from the disengaged position to the engaged position, the pilot drill defining an overall diameter measuring greater than a diameter of the pilot hole with the detent in the engaged position.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 3 is a top perspective view of a pair of bars of a detent of the pilot drill of FIG. 1.

FIG. 4 is a side view of a bar of the detent of the pilot drill of FIG. 1 in accordance with another aspect of the current disclosure.

DETAILED DESCRIPTION

Figure 1:
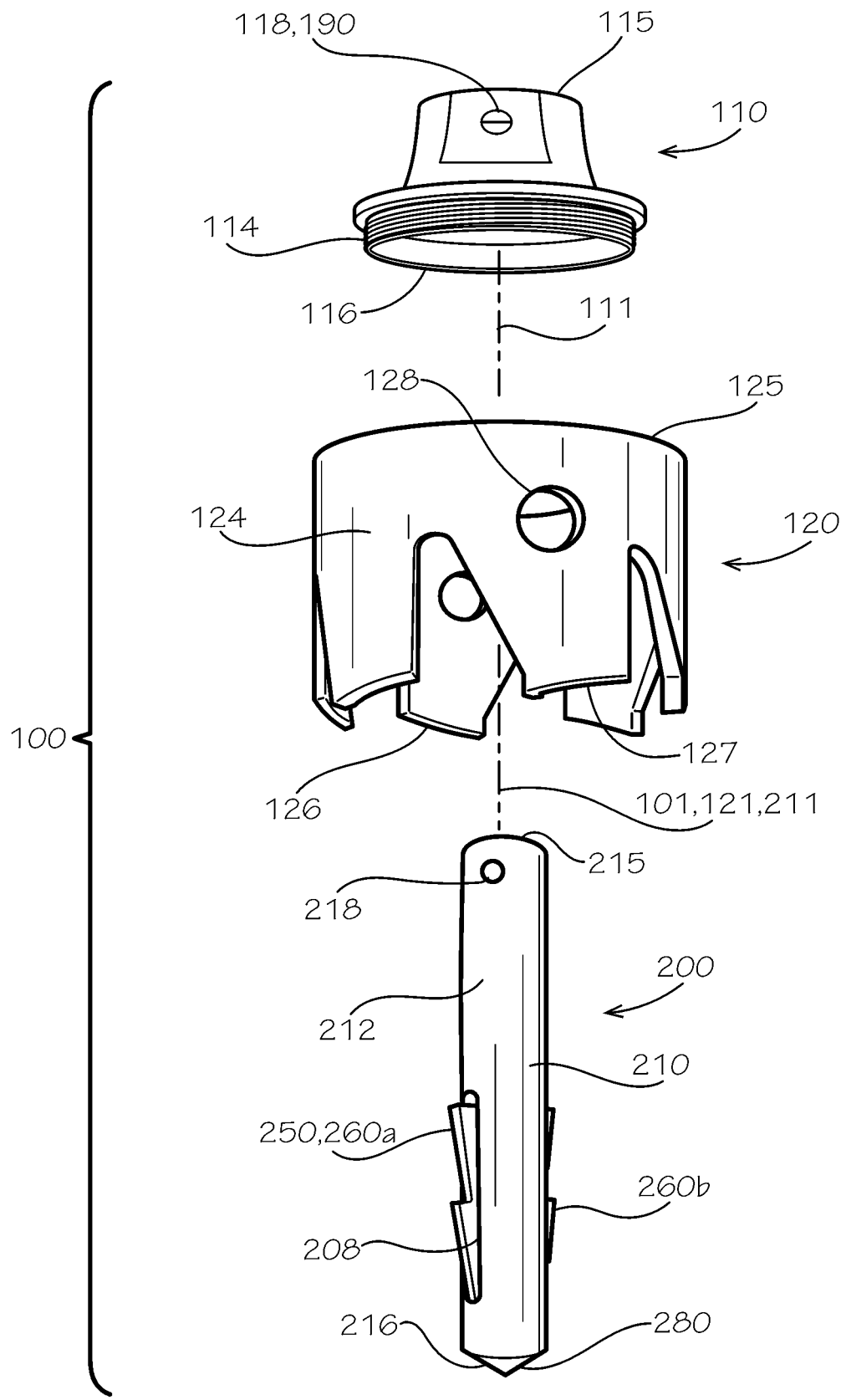
FIG. 1 is an exploded side perspective view of a pipe cutter assembly with a pilot drill, a shell cutter, and a cutter hub in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

In one aspect, a pilot drill for a drilling apparatus and associated methods, systems, devices, and various apparatuses are disclosed herein. In one aspect, the pilot drill can comprise a detent and a biasing element.

Drilling a hole 88a (shown in FIG. 10) in one side of a wall 83 (shown in FIG. 9) of an already formed pipe 80 (shown in FIG. 9) or completely through the pipe 80—so as to produce two holes 88a,b—can be either beneficial or necessary. The holes 88a,b can be of such a diameter as to require a special drilling apparatus 100 comprising, as described herein, more than just a standard drill bit. Moreover, it can be either beneficial or necessary to be able to more easily remove pipe coupons 1050a,b (shown in FIG. 10) from the drilling apparatus 100 and specifically from inside a shell cutter 120 or the drilling apparatus 100 from the pipe 80.

FIG. 1 is an exploded side perspective view of a drilling apparatus 100. As shown, the drilling apparatus 100 can comprise a cutter hub 110, a shell cutter 120, and a pilot drill 200, which can be assembled to each other along a drill axis or longitudinal axis 101. More specifically, the cutter hub 110 can define a hub axis 111, the shell cutter 120 can define a cutter axis 121, and the pilot drill 200 and specifically the shaft 210 can define a longitudinal axis 211.

The cutter hub 110 can define a first end 115 and a second end 116 distal from the first end 115. The cutter hub 110 can define a threaded portion 114 on or proximate to the second end 116 for engagement with a corresponding threaded portion (not shown) of the shell cutter 120. The cutter hub 110 can define a hole 118, which can be sized to receive a fastener 190. The fastener 190 can be used to assemble the pilot drill 200 to the cutter hub 110 and to fix the parts with respect to one another. A firm, positive connection between the cutter hub 110 and the pilot drill 200 such as with the fastener 190 can be beneficial due to the high torque values experienced by the drilling apparatus 100 during use.

The shell cutter 120 can define a first end or trailing end 125 and a second end or leading end 126 distal from the trailing end 125. The shell cutter 120 can define the aforementioned threaded portion (not shown) proximate to the trailing end 125. The shell cutter can comprise a wall 124 and, as part of the wall 124, can define a plurality of teeth 127 proximate to the leading end 126. In some aspects, the shell cutter 120 can define an outer diameter measuring, for example and without limitation, in a range of 3 inches to 12 inches. The shell cutter 120 can further define one or more clearance holes 128, which can be used to facilitate removal of waste such as the pipe coupons 1050a,b (shown in FIG. 10) from the shell cutter 120 after cutting of the pipe 80.

The pilot drill 200 can define a shaft 210, which can define a first end 215, a second end 216, and longitudinal axis 211. The shaft 210 can define a fastener hole 218, which can be sized to receive the fastener 190 and create the aforementioned connection between the cutter hub 110 and the pilot drill 200, specifically the shaft 210 of the pilot drill 200. The shaft 210 can define a detent cavity 208 extending from an outer surface 212 of the shaft 210 towards the longitudinal axis 211. The shaft 210 can comprise a cutting edge 280, which can be positioned proximate to the outer surface 212. In some aspects, the cutting edge 280 can be positioned on a tip of the pilot drill 200 on or proximate to the second end 216. In other aspects, the cutting edge 280 can be positioned on, protruding from, or proximate to a radially outermost portion of the outer surface 212. The shaft 210 can be configured to rotate about the longitudinal axis 211 during use and thereby cut through the wall 83 (shown in FIG. 10) of the pipe 80 (shown in FIG. 10) with the aid of the cutting edge 280. As shown, the pilot drill 200 can further comprise a detent 250, which can comprise bars 260a,b. Each of the bars 260a,b can be positioned at least partially within the detent cavity 208.

Figure 2:
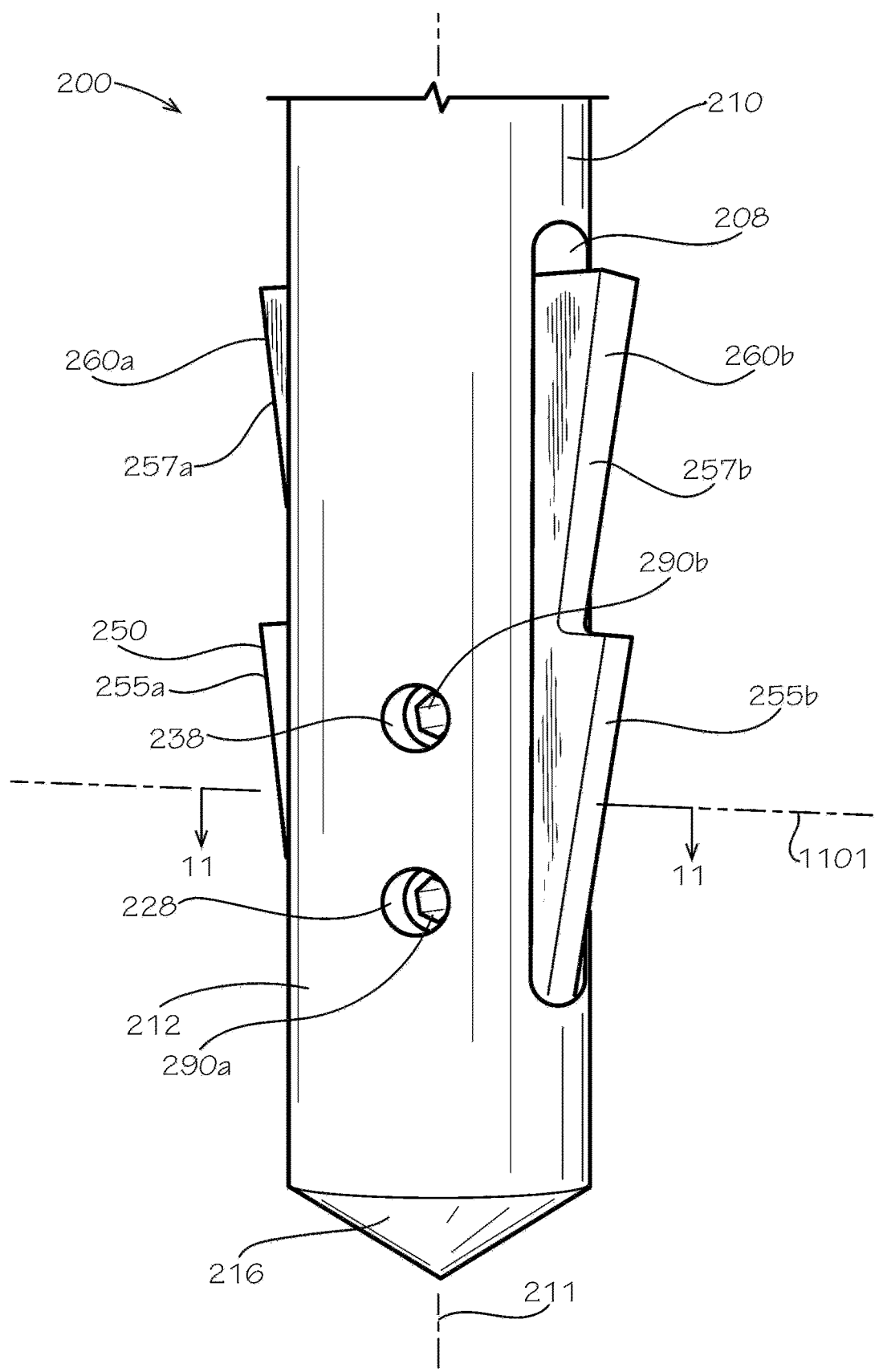
FIG. 2 is a side perspective view of the pilot drill of FIG. 1.

FIG. 2 is a side perspective view of the pilot drill 200. As shown, the pilot drill 200 and specifically the shaft 210 can define a first fastener bore 228, which can define a bore axis 221 (shown in FIG. 5), and a second fastener bore 238, which can likewise define a bore axis 231 (shown in FIG. 5). A bore axis such as, for example and without limitation, the bore axis 221 can be angled with respect to an extension direction 1101 of the detent cavity 208. As shown, the bore axis 221 can be angled 90 degrees with respect to the extension direction 1101 of the detent cavity 208.

As shown, the detent 250 can be held in place inside the detent cavity 208 with fasteners 290a,b, which can extend through the respective fastener bores 228,238 of the shaft 210 and through corresponding openings 328a,b,338a,b (328a,b,338a,b shown in FIG. 4) of the bars 260a,b. In particular, the fastener 290a extending through the first fastener bore 228 can define a pivot axis 291 (shown in FIG. 5), which can be coaxial with the bore axis 221. Each of the bars 260a,b can be configured to rotate about the pivot axis 291 from a disengaged (or retracted) position within the detent cavity 208 to an engaged (or protruding) position extending past the outer surface of the shaft 210 with respect to the longitudinal axis 211 when the bar 260a,b is in the engaged position.

In some aspects, as shown, each bar 260a,b of the detent 250 can define two ears 255a,b,257a,b, respectively, each of which can extend past the outer surface 212 of the shaft 210 with respect to the longitudinal axis 211 when the bar 260a,b is in the engaged position shown. In other aspects, each bar 260a,b of the detent 250 can define any number of ears 255, including one ear 255 or more than two ears 255.

FIG. 3 is a top perspective view of the detent 250 of the pilot drill 200, which can comprise the bars 260a,b. As shown, each of the bars 260a,b can define a respective first side 310a,b and a respective second side 320a,b distal from the first side 310a,b. Each of the bars 260a,b can define a respective inside end 330a,b and a respective outside end 340a,b distal from the respective inside end 330a,b. Each of the bars 260a,b can define a respective leading end 350a,b (350a shown in FIG. 5) and a respective trailing end 360a,b distal from the respective leading end 350a,b. Each of the bars 260a,b can define the respective openings 328a,b,338a,b, which can extend from the respective first side 310a,b to the respective second side 320a,b proximate to the respective leading end 350a,b. The bar 260a,b can further define a base portion or base 370a,b and the ear portions or ears 255a,b,257a,b. When the detent 250 is installed inside the detent cavity 208 of the shaft 210, the base 370a,b can be proximate to the longitudinal axis 211 of the shaft 210 on one side of a respective shear line 301 and the ear 255a,b, 257a,b can be distal from the longitudinal axis 211 and on the other side of the shear line 301.

As shown, each of the ears 255a,b,257a,b can define a barbed shape or be described as a barb, where a barbed shape is narrower proximate to a leading end such as the respective leading end 350a,b and wider distal from the respective leading end 350a,b and proximate to a trailing end such as the trailing end 360a,b. In some aspects, as shown, the detent can comprise multiple barbs in the form of multiple instances of the ears 255a,b,257a,b on a single bar 260a,b. In some aspects, as shown, the detent 250 can comprise the two bars 260a,b, and the detent cavity 208 can extend from each of opposite sides of the outer surface 212 of the shaft 210 relative to the longitudinal axis 211 and towards the longitudinal axis 211. Moreover, at least when formed together as shown, the two bars 260a,b can retract into the detent cavity 208 of the shaft together and simultaneously. In other aspects, the detent 250 can comprise just one of the bars 260a,b, and the detent cavity 208 can extend from a single side of the outer surface 212 of the shaft 210 relative to the longitudinal axis 211 and towards the longitudinal axis 211. In other aspects, separate bars 260a,b comprising separate ears 255a,b,255a,b can pivot on separate pivot axes 291—inside the same detent cavity 208 or inside separate detent cavities 208—and can retract independently from each other. For example and without limitation, the pilot drill 200 can comprise multiple instances of the detent 250 and the bars 260a,b shown in FIG. 7.

Each of the ears 255a,b,257a,b can define a respective shoulder 355a,b,357a,b and a respective ramp 356a,b,358a,b. In some aspects, each of the shoulders 355a,b can be angled at approximately or exactly 90 degrees with respect to the outer surface 212 (shown in FIG. 2) of the shaft 210 (shown in FIG. 2) with the detent in the engaged position shown in FIG. 2. In other aspects, each of the shoulders 355a,b can be angled at less than 90 degrees (an acute angle) with respect to the outer surface 212 (shown in FIG. 2) of the shaft 210 (shown in FIG. 2) with the detent in the engaged position shown in FIG. 2 in order to facilitate capture of the pipe coupons 1050a,b on the detent 250. Furthermore, an intersection between the ramp 356a,b,358a,b and the respective shoulder 355a,b,357a,b can form a sharp point or peak to facilitate capture of the pipe coupons 1050a,b on the detent 250. In other aspects, this intersection can be slightly rounded or the ears 255a,b,257a,b can be rounded when viewed along the axis 201 of the pilot drill 200 to facilitate passage of the detent 250 and specifically the bars 260a,b through pilot holes 980a,b (shown in FIG. 10) and to, as desired, more closely match the diameter D (shown in FIG. 11) of the pilot drill 200. The shoulder 355a,b,357a,b can be positioned proximate to the respective trailing end 360a,b of the bar 260a,b relative to the leading end 350a,b and can face at least partly in a direction opposite from a cutting direction 910 (shown in FIG. 9) of the pilot drill 200, i.e., in a removal direction 1010 (shown in FIG. 10). The ramp 356a,b,358a,b can extend from a radially outermost end of the shoulder 355a,b,357a,b towards the leading end 350a,b of the respective bar 260a,b.

Each of the bars 260a,b can define a shear line 301 at an intersection of the ear 255a,b,257a,b and the corresponding base 370a,b, to facilitate removal of the ears 255a,b,257a,b from the base 370a,b. In some aspects, as shown, the shear lines 301 can comprise weakened portions 390a,b,c, which can be defined as grooves in either the first side 310a,b or the second side 320a,b of the respective bar 260a,b. The shear line 301 and, as exemplarily shown, the weakened portion 390a,b,c can facilitate removal of the ears 255a,b,257a,b from the base 370a,b by providing or defining a weakened portion between the ears 255a,b,257a,b and the base 370a,b. In some aspects, a guide 380 can facilitate movement of the bar 260a past and with respect to the bar 260b by occupying a portion of the bar cavity 508 and maintaining a desired distance or offset between the bars 260a,b. Overlap of the bars 260a,b of the detent 250 can help hold a biasing element 500 (shown in FIG. 5) captive inside the detent 250, can guide the bars 260a,b past each other, and can keep debris out of the detent 250 for continued smooth operation.

A need for removal of the pilot drill 200 from the pipe 80 may arise from an issue with the drilling equipment that powers the drilling apparatus 100 and thereby rotates the pilot drill 200 and the shell cutter 120. For example, a motor of the drilling equipment in which the drilling apparatus is chucked or installed can stall and require servicing before completion of cutting of the holes in the pipe 80. Also, the detent 250 of the pilot drill 200 or the pilot drill 200 can for another reason become stuck inside the pipe 80. Additionally, the detent 250 can engage with the pipe coupon 1050a,b and, for example, the motor stall or bit can become unacceptably dull before the pipe coupon 1050a,b separates form the pipe 80. In these and other cases, removal of the ears 255a,b,257a,b can ease removal of the pilot drill 200 from the pipe 80 in a way not believed possible with previously available structures and methods. Removal of the pipe coupons 1050a,b from the pilot drill 200 or the pilot drill 200 from the pipe 80 can be awkward and difficult using previously available structures and methods and can require special skill, time, patience, and even separate tools such as a pry bar to physically separate the parts. Upon resolution of the issue that necessitates removal of the drilling apparatus 100, the drilling apparatus 100 can be reinserted and the drilling of the holes 88a,b can be completed. Alternately, upon the completion of drilling using the drilling apparatus 100 and removal of pipe coupons 1050a,b (shown in FIG. 10) by disengagement of the detent 250, e.g., by moving or pushing the bars 260a,b of the detent 250 in a radially inward direction with respect to the longitudinal axes 101, 901, the drilling apparatus 100 can then be used to cut the holes 88a,b in a different pipe 80.

In some aspects, the weakened portion 390a,b,c can define a rectangular shape in cross-section. In other aspects, the weakened portion 390a,b,c can define a rounded shape or define a rounded groove bottom in cross-section. In other aspects, the shear line 301 can define or be defined by any other feature for weakening the bar such as, for example and without limitation, a plurality of holes of potentially any shape, as if to perforate the bar along the shear line 301 and thereby weaken the intersection between the ears 255a,b, 257a,b and the base 370a,b.

Figure 5:
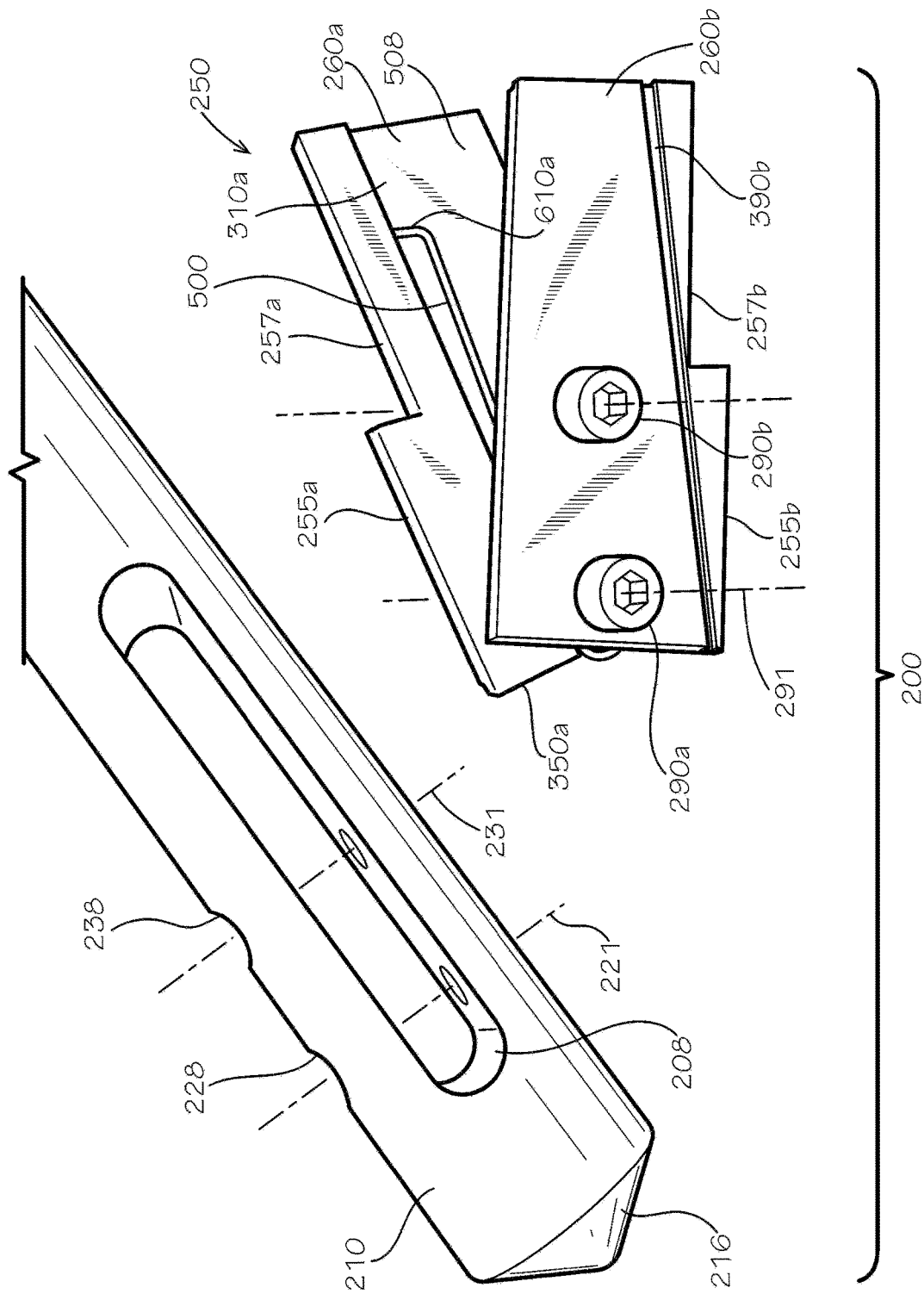
FIG. 5 is a side perspective view of the pilot drill of FIG. 1 in a partially unassembled condition.

As shown, the first opening 328a,b can extend from the first side 310a,b to the second side 320a,b and can be a circular hole, and the fastener 290a can comprise a circular shaft such as a shaft 294a (shown in FIG. 6) sized to fit within the first opening 328a,b and configured to restrict radial movement of the bar relative to the common pivot axis 291 (shown in FIG. 5). In contrast, the second opening 338a,b, which can also extend from the first side 310a,b to the second side 320a,b, can be a slot defining a long dimension measured in a direction perpendicular to the longitudinal axis 211 of the shaft 210. The second opening 338a,b can be positioned between the first opening 328a,b and the trailing end 360a,b of the bar 260a,b. Again, like the first fastener 290a, the second fastener 290b can extend through both the shaft 210 and the respective bar 260a,b. In other aspects, as shown in FIG. 2, any of the fasteners 290a,b can be a set screw without a head 292a,b (shown in FIG. 6).

In some aspects, as shown, the ramp 358a,b of the second ear 257a,b of the bar 260b can intersect with the shoulder 355a,b of the first ear 255a,b. Also, as shown, the ear 255a,b,257a,b can define a single ramp such as the ramp 356a,b,358a,b.

FIG. 4 is a side view of the detent 250 of the pilot drill 200. In contrast with aspects shown in FIG. 3, the ramp 358a,b of the second ear 257a,b of the bar 260a,b—or at least an end of the ramp 358a,b distal from the shoulder 357a,b—can be offset in an axial direction with respect to the longitudinal axes 101,211 (shown in FIG. 1) from the shoulder 355a,b of the first ear 255a,b. Similarly, the ramp 356a,b of the first ear 255a,b of the bar 260a,b—or at least an end of the ramp 356a,b distal from the shoulder 355a, b—can be offset in an axial direction with respect to the longitudinal axes 101,211 (shown in FIG. 1) from a shoulder of an adjacent ear (if present) or from the leading end 350a,b of the bar 260a,b. As shown, the ear 255a,b,257a,b can define not only the respective ramps 356a,b,358a,b but also can define additional ramps 456a,b,458a,b, which can be angled with respect to the respective ramps 356a,b,358a,b and which themselves can be offset from a shoulder of an adjacent ear (if present) or from the leading end 350a,b of the bar 260a, b.

FIG. 5 is a side perspective view of the pilot drill 200 in a partially unassembled condition. As shown, the pilot drill 200 can comprise a biasing element 500, which can be positioned adjacent to each of the bars 260a,b and at least partially or completely within the detent cavity 208. More specifically, the biasing element 500 can be received within a bar cavity 508 defined by the respective first sides 310a,b of the bars 260a,b. The biasing element can define ends 610a,b (610b shown in FIG. 6), which can be held captive inside a groove, hole, or other cavity (not shown), which can be defined in the corresponding first sides 310a,b (310b shown in FIG. 3) of the respective bars 260a,b.

In some aspects, as shown, the detent 250 can comprise a pair of the fasteners 290a,b. In other aspects, the detent 250 can comprise a single fastener 290a or 290b or can comprise neither of the fasteners 290a,b. In such aspects, the structure of shaft 210 including the interior surfaces of the detent cavity 208 can function as a pivot and effectively define the pivot axis 291 for the bars 260a,b.

Figure 6:
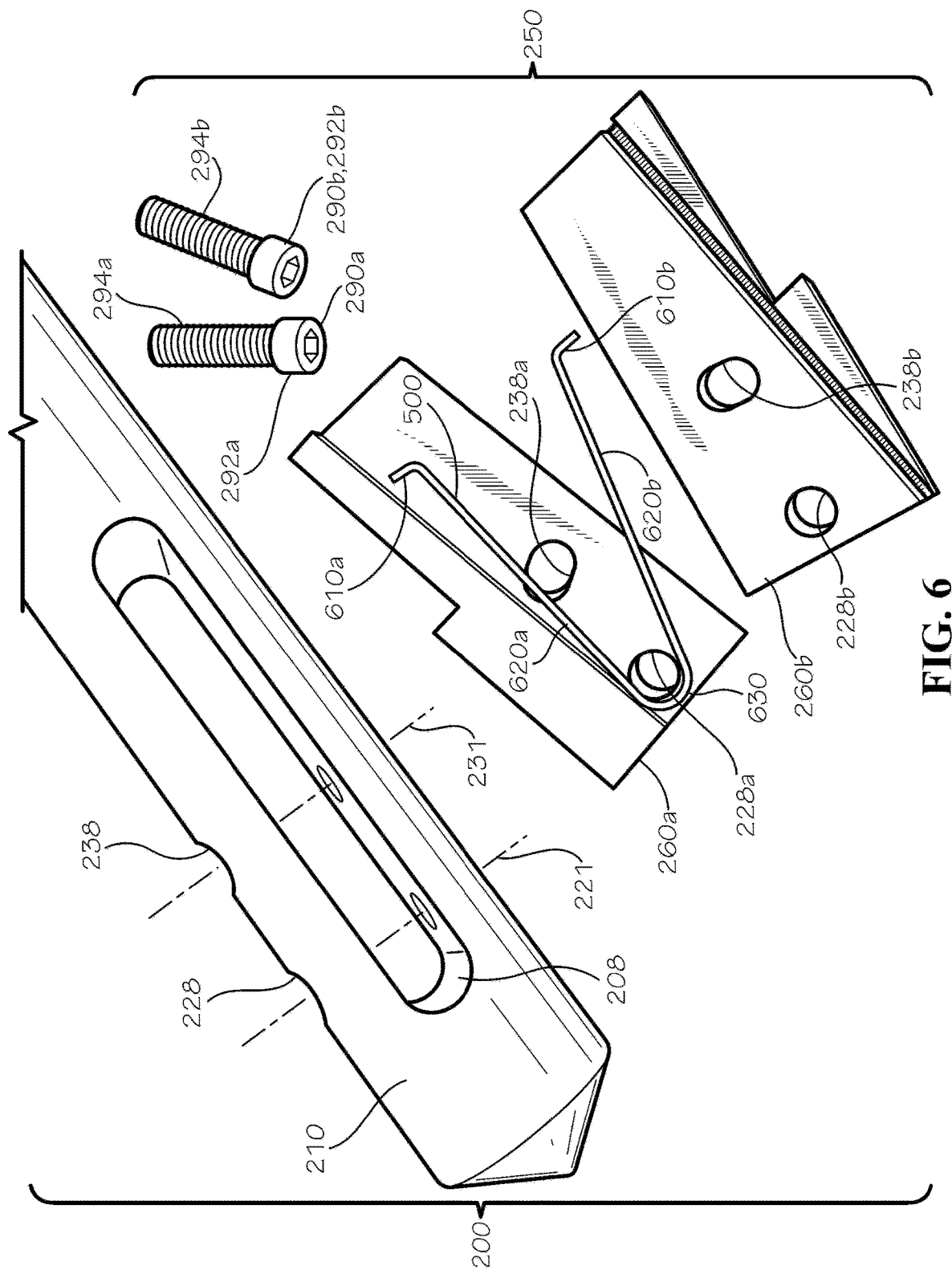
FIG. 6 is a side perspective view of the pilot drill of FIG. 1 in a completely unassembled condition.

FIG. 6 is a side perspective view of the pilot drill 200 in a completely unassembled condition. In some aspects, as shown, the biasing element 500 can be a torsion spring, where a torsion spring is a spring that stores mechanical energy when a first end such as the end 610a is rotated with respect to a second end such as the end 610b. In some aspects, as shown, the torsion spring can comprise zero coils at a valley or vertex or transition portion 630 between a first leg 620a and a second leg 620b. In other aspects, the torsion spring can comprise one or more coils, which can be used to adjust the spring constant or force with which the spring pushes back when displaced by a predetermined amount. As shown, the biasing element can define a V shape, and the transition portion 630 of the biasing element 500 can be positioned proximate to the pivot axis 291 (shown in FIG. 5) and a distal end of each of the two legs 620a,b of the biasing element 500 can extend towards the trailing end 360a,b of the bar 260a,b. In some aspects, the transition portion 630 of the spring can encircle and be locked in place by the fastener 290a and be substantially aligned with the bore axis 221 and the pivot axis 291. Furthermore, the biasing element 500 can be positioned between the first bar 260a and the second bar 260b inside the bar cavity 508 (shown in FIG. 5) and can be configured to push each of the first bar 260a and the second bar 260b away from each other and away from the longitudinal axis 211 of the shaft 210. The ends 610a,b of the biasing element 500 can be angled with respect to the legs 620a,b. Each of the fasteners 290a,b can comprise the head 292a,b and the shaft 294a,b or a shaft 294b. In some aspects, each of the shafts 294a,b can define threads for engagement with a nut or other mating fastener (not shown) on an opposite side of the shaft 210. In other aspects, each of the fastener bores 228,238 can define threads on an opposite side configured for engagement with the corresponding shafts 294a,b of the fasteners 290a,b.

Figure 7:
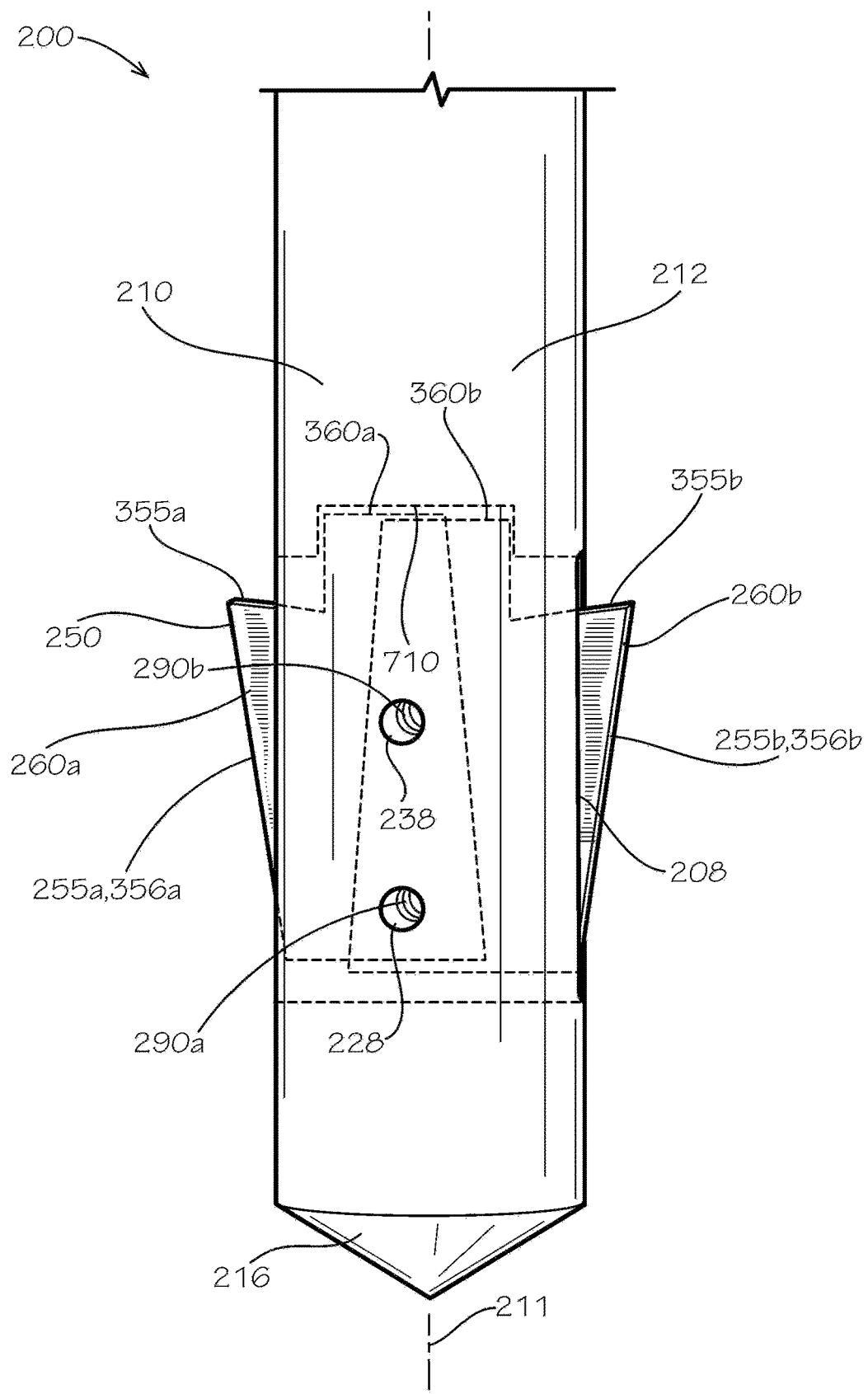
FIG. 7 is a side perspective view of the pilot drill of FIG. 1 in accordance with another aspect of the current disclosure.
Figure 8:
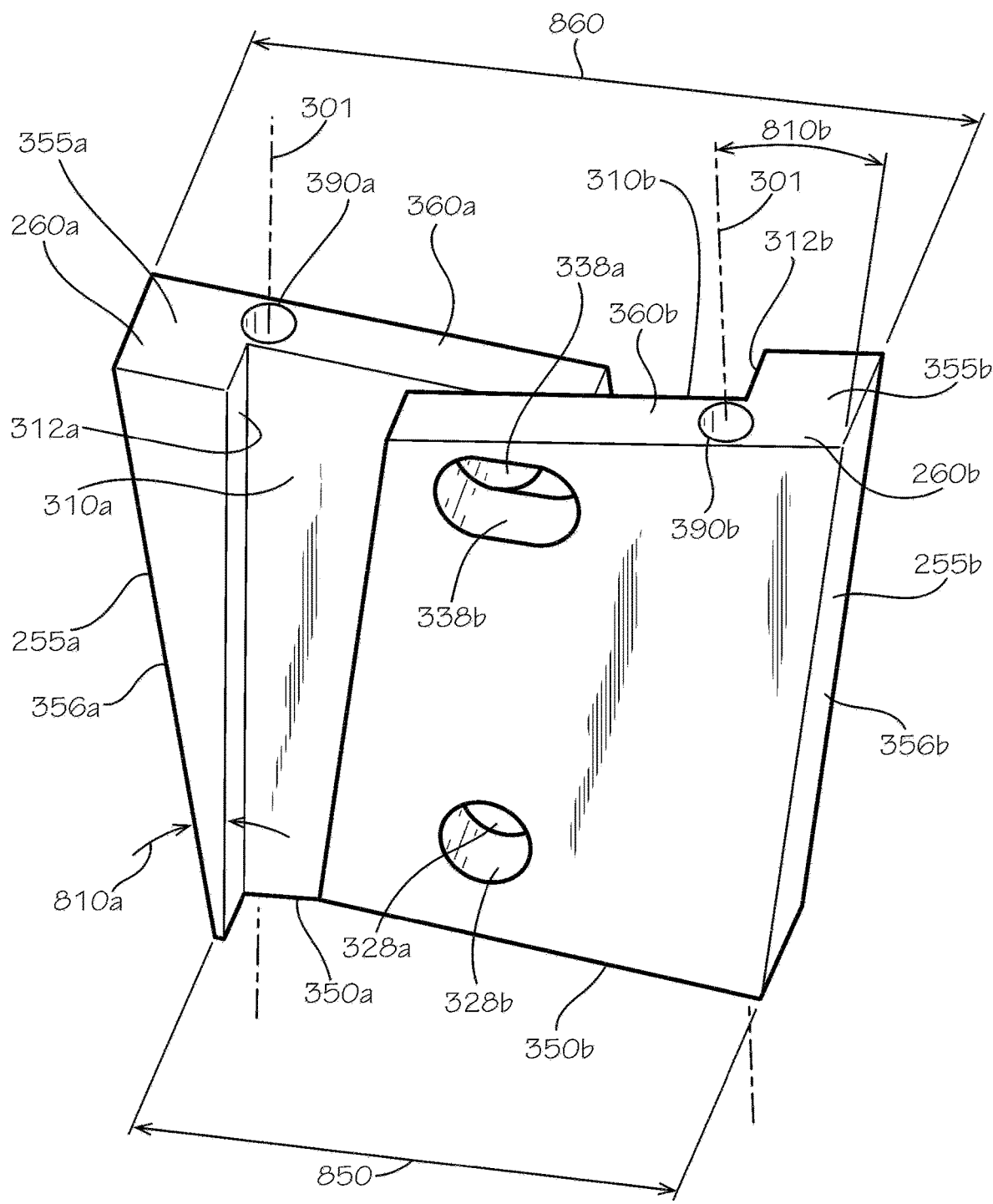
FIG. 8 is a top perspective view of a pair of bars of a detent of the pilot drill of FIG. 7.

As shown in FIGS. 7 and 8, in some aspects, each bar 260a,b of the detent 250 can define only one ear 255a,b. Shown specifically in FIG. 7, which is a side perspective view of the pilot drill 200, each of the shoulder 355a,b can be angled at less then 90 degrees with respect to the outer surface 212 of the shaft 210 with the detent in the engaged position shown. As shown, the fastener bores 228,238 can define a constant diameter and can be sized together with the openings 328,338 of the bars 260a,b to receive the fastener 290a,b when, for example, each of the fasteners 290a,b is a set screw not necessarily comprising the aforementioned head 292a,b.

In some aspects, as shown in FIG. 7, the second openings 338a,b and the fastener 290b can be absent and yet the bars 260a,b still retained within the detent cavity 208 when, for example, movement of the bars 260a,b proximate to the trailing end 360a,b is limited by interaction between the bars 260a,b and the shaft 210, including interior surfaces such as formed by a pocket 710 proximate to a trailing or top end of the detent cavity 208 to prevent the bars 260a,b from moving too far in or out with respect to longitudinal axis 211.

FIG. 8 shows a top perspective view of the bars 260a,b of the detent 250 of the pilot drill 200 but without the biasing element 500 therebetween. Each of the ramps 356a,b can define a respective ramp angle 810a,b with respect to an radially inward facing portion 312a,b of the first side 310a,b or a portion of the shear line 301 or respective weakened portion 390a,b,c as shown. As oriented, the detent 250 is in the engaged position with a bottom or leading detent width 850 measuring less than a top or trailing detent width 860. While the fasteners 290a,b (shown in FIG. 7) are removed for clarity, by the position of each of the openings 338a,b it is evident that the upper fastener 290b in combination with the slotted openings 338a,b allows the bars 260a,b to rotate radially outwards towards the engaged position of the detent 250 but would prevent further opening of the detent 250 at the top (and further widening of the trailing detent width 860) beyond that desired by the user. The upper fastener 290b in combination with the slotted openings 338a,b allows closing of the detent 250 at the top (and narrowing of the trailing detent width 860) in a radially inward direction to a limit set by the respective long dimensions of the slots defined by the openings 338a,b.

As shown in FIG. 8, each of the weakened portions 390a,b can define a hole extending lengthwise through the respective bar 260a,b from the trailing end 360a,b to the leading end 350a,b along and aligned with the shear line 301 or themselves defining the shear line 301. By weakening the bar 260a,b with the weakened portions 390a,b inside, the ear 255a,b,257a,b can be just as easy to shear off when necessary. In addition, the bar 260a,b can also be more stable and resistant under conditions that might bend or otherwise damage or remove the ear 255a,b,257a,b when such damage or removal is undesirable in comparison with removing material from the side 310a,b or the side 320a,b such as with the aforementioned groove shape. In some aspects, as shown, a diameter of the weakened portion 390a,b can be close to a distance from the side 310a,b to the corresponding side 320a,b. In other aspects, the diameter can be adjusted to cause the bar 260a,b to be more or less resistant to shearing at the corresponding shear line 301.

Figure 9:
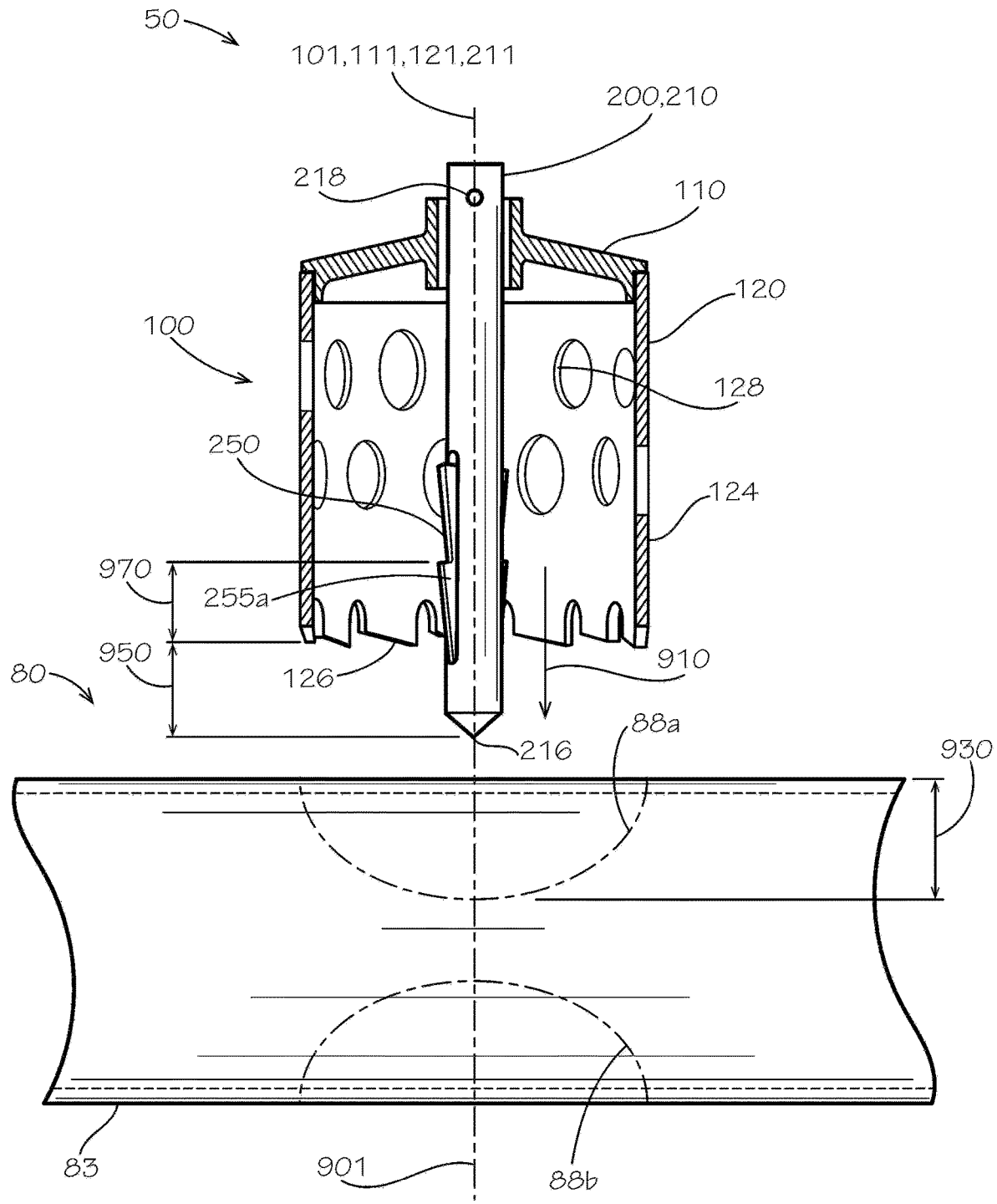
FIG. 9 is a side view of a shell cutting system for cutting a pipe before removal of pipe coupons from a pipe wall of the pipe, with the shell cutter shown in cross-section.
Figure 10:
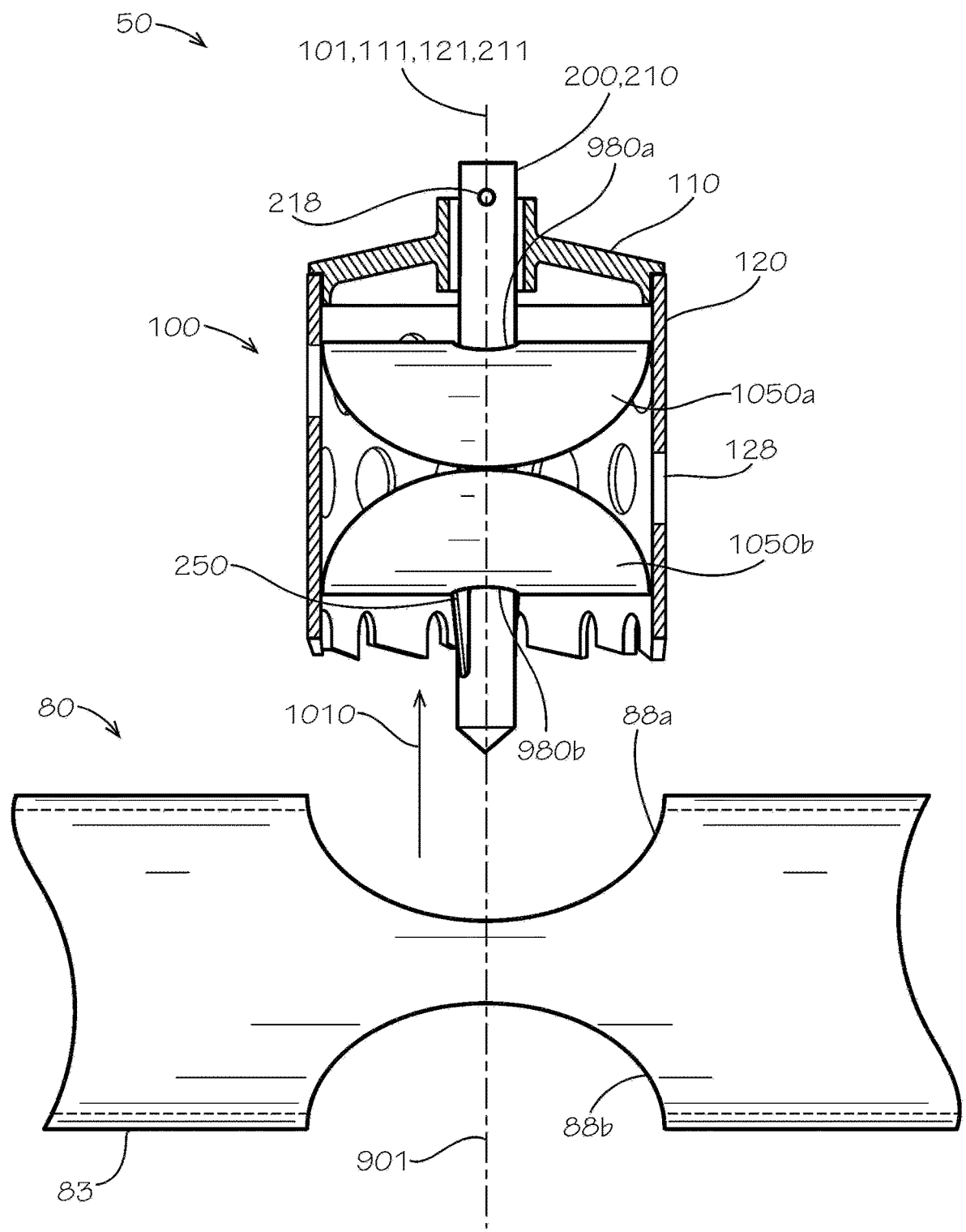
FIG. 10 is a side view of the shell cutting system of FIG. 9 after removal of the pipe coupons from the pipe wall of the pipe.

FIGS. 9 and 10 show a shell cutting system 50 comprising the drilling apparatus 100 and the pipe 80. FIG. 9 is a side view of the shell cutting system 50 for cutting the pipe 80 before removal of the pipe coupons 1050a,b from the wall 83 of the pipe 80, and FIG. 10 is a side view of the shell cutting system 50 after removal of the pipe coupons 1050a,b from the wall 83 of the pipe 80. As shown in FIG. 9, the shell cutter 120 can define the wall 124 and be guided by the pilot drill 200, which can define a cut axis 901 extending through the pipe 80. As shown, an inner surface of the wall 124 can be offset from the outer surface 212 of the shaft 210 of the pilot drill 200. The leading end 126 of the shell cutter 120 can be offset in an axial direction by an offset distance 950 behind a tip of the leading end or second end 216 of the shaft 210 of the pilot drill 200 to allow the pilot drill 200 to sufficiently engage first with the pipe 80 and prevent the aforementioned "walking" of the drilling apparatus 100 on the surface of the pipe 80.

An ear of the detent 250 such as the ear 255a (shown in FIG. 2) can be offset by an offset distance 970 from the leading end 126 of the shell cutter 120. The detent 250 can be offset towards the cutting hub 110 by the offset distance 970 to limit the extension of the pilot drill 200 beyond the shell cutter 120. More specifically, the offset distance 970 can be adjusted so that the detent 250 engages the pipe coupon 1050a,b before the pipe coupon 1050a,b is fully cut from the pipe 80, which will generally be the case when the offset distance 970 is less than a coupon height 930 shown (not taking into account the thickness of the wall 83, which can effectively increase the coupon height 930).

The cutter hub 110 and the shell cutter 120 can be configured to rotate together with the pilot drill 200 about the longitudinal axis 101 during use and thereby also cut through the wall 83 of the pipe 80. The pilot drill 200 can first drill the pilot hole 980a,b (shown in FIG. 10), and the pilot drill 200 can then guide the movement of the shell cutter 120 through a larger surrounding portion of the wall 83. The detent 250 can pivot radially inward towards the disengaged position when the pilot drill 200 is going through the wall 83—and in the process drilling the pilot hole 980a,b—and then can pivot outward towards the engaged position out after the pilot drill 200 exits the wall 83 after drilling the pilot hole 980a,b. Upon cutting through the wall 83 of the pipe 80, the pipe coupons 1050a,b can remain and will generally need to be removed so as not to block the pipe 80 or cause blockage or damage downstream from the pipe 80. Removal of the pipe coupons 1050a,b can be facilitated by the detent 250 catching on—or, alternately stated, catching the detent 250 on—one or both of the pipe coupons 1050a,b proximate to one or both of the pilot holes 980a,b, depending on the specific arrangement of the detent 250 on the pilot drill 200. In some aspects, only the lower pipe coupon 1050b need be retained by the detent 250 because the upper pipe coupon 1050a can be retained by the lower pipe coupon 1050b. It can be beneficial for the pipe coupons 1050a,b to separate from each other and nest within the shell cutter 120 because, for example, a shorter shell cutter 120 can then be used. After the drilling apparatus 100 has drilled through the pipe 80 and, as shown in FIG. 10, has been pulled away from the pipe 80 as desired to provide access to inside the shell cutter 120, an operator can reach up into the shell cutter 120 to remove the pipe coupons 1050a,b. More specifically, the operator can push the ears 255a,b (shown in FIG. 2) of the detent 250 radially inward to disengage the detent 250 and release the pipe coupons 1050a,b and can then manually remove the pipe coupons 1050a,b.

Figure 11:
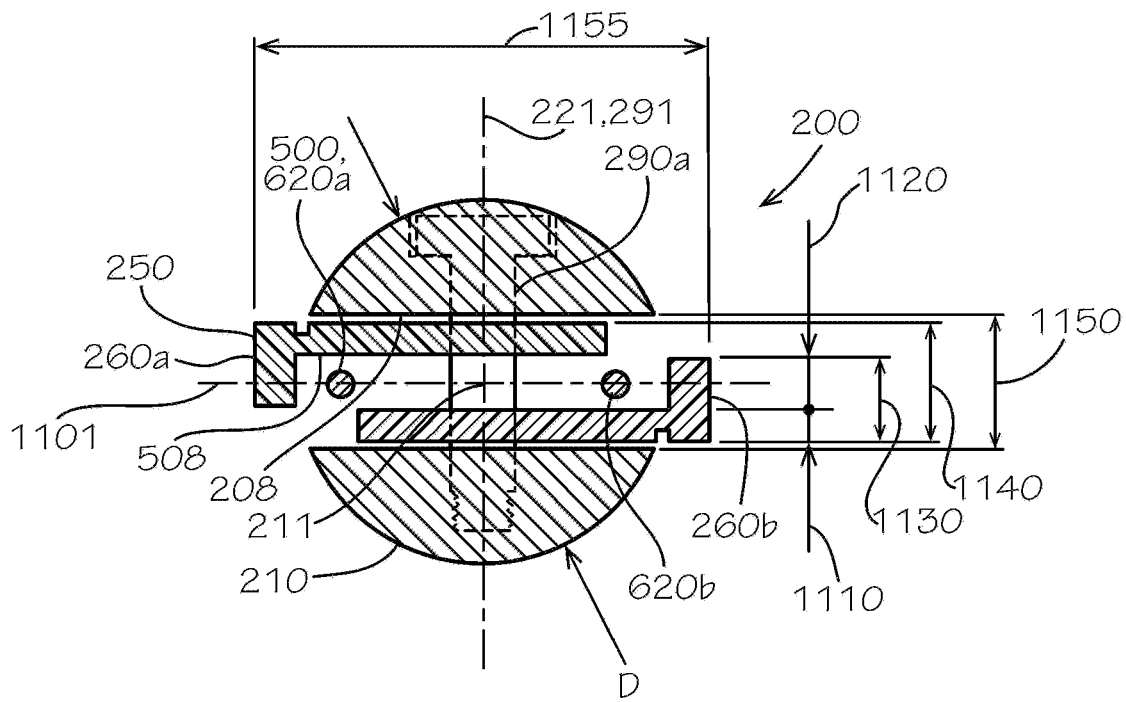
FIG. 11 is a sectional view of the pilot drill of FIG. 2 taken along line 11-11 of FIG. 2 with the detent of FIG. 1 in an engaged condition.
Figure 12:
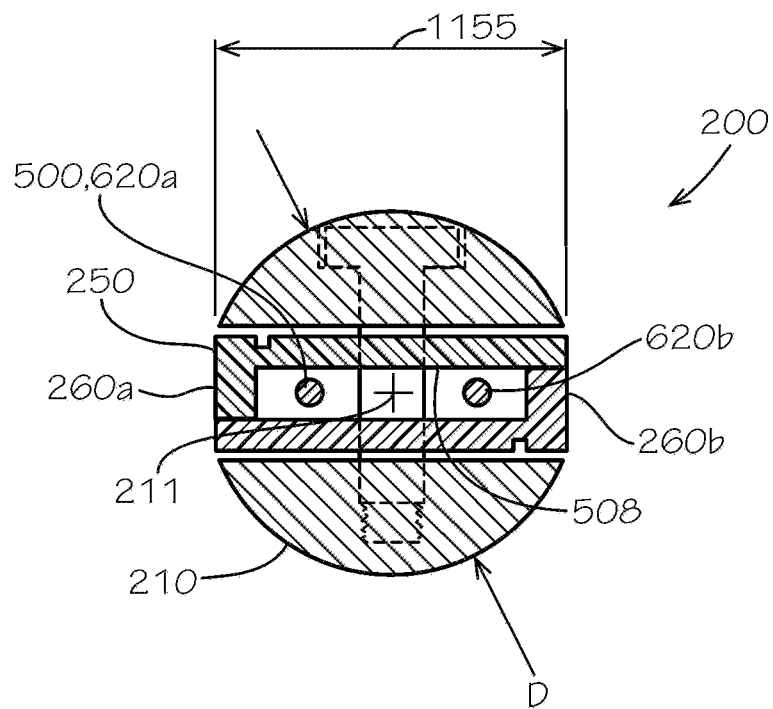
FIG. 12 is a sectional view of the pilot drill of FIG. 2 taken from the same perspective as FIG. 11 with the detent of FIG. 1 in a disengaged condition.

FIGS. 11 and 12 are sectional view of the pilot drill 200 taken along line 11-11 of FIG. 2. FIG. 11 is a sectional view of the pilot drill 200 with the detent 250 in an engaged condition. In the engaged position, the detent 250 can define a detent width 1155 that is greater than a diameter D of the shaft 210 of the pilot drill 200. As shown, measured along a direction parallel to the pivot axis 221 and the pivot axis 291 (shown in FIG. 5), each of the bars can define a bar thickness 1110, an ear extension thickness 1120, a total ear thickness 1130, a detent thickness 1140, and a detent cavity thickness or detent cavity width 1150. The detent thickness 1140 can be less than the detent cavity width 1150 by a distance sufficient to facilitate free movement of the bars 260a,b between the engaged and the disengaged positions. In some aspects, as shown, the ear extension thickness 1120 can be less than or equal to a distance across the bar cavity 508 between the bars 260a,b. In other aspects, the ear extension thickness 1120 can extend across the detent cavity 208 and as desired a width of the respective bar 260a,b in a direction parallel to the extension direction 1101 can be shortened to accommodate the change. A washer (not shown), optionally positioned about the fastener 290a and aligned with the pivot axis 221 and the pivot axis 291, can maintain a constant distance between the bars 260a,b inside the bar cavity 508.

FIG. 12 is a sectional view of the pilot drill 200 with the detent 250 in a disengaged condition. In the disengaged position, the detent 250 can define a detent width 1155 that is less than or equal to the diameter D of the shaft 210 of the pilot drill 200.

The drilling apparatus can alternately be a pipe cutter, a pipe hole cutter, a hole saw, or a pipe cutting tool.

A method of using the drilling apparatus 100 can comprise rotating the drilling apparatus 100 about the longitudinal axis 211 of the shaft 210 of the pilot drill 200 at a speed sufficient to form the pilot hole 980a,b in the wall 83 of the pipe 80. The method can further comprise rotating the bars 260a,b about the pivot axis 291 of the pilot drill 200 from the engaged position to the disengaged position. The method can further comprise forming the pilot hole 980a,b in the wall 83 of the pipe 80 with the pilot drill 200. The method can further comprise forming one or both of the coupons 1050a,b with the shell cutter 120. The method can further comprise passing the detent 250 of the pilot drill 200 through the wall 83 of the pipe 80 with the detent 250 in the disengaged position. The method can further comprise moving the detent 250 from the disengaged position (to be able to pass through the pilot hole 980a,b) to the engaged position (to retain one or both pipe coupons 1050a,b upon passing through and clearing the pilot hole 980a,b). The method can further comprise engaging the detent 250 of the pilot drill 200 on an edge of one of the cut pipe coupon 1050a,b of the wall 83 of the pipe 80 to capture one or both of the pipe coupons 1050a,b on the drill 200. More specifically, the step of engaging the detent 250 with one of the pipe coupons 1050a,b can comprise moving the biasing element 500 the detent 250 from the disengaged position to the engaged position, the pilot drill 200 defining an detent width 1155 (shown in FIG. 11) measuring a dimension not only greater than the diameter D of the shaft 210 but also greater than a diameter of the pilot hole 980a,b with the detent 250 in the engaged position. The method can further comprise removing one or both of the cut pipe coupons 1050a,b of the pipe 80 from the pipe 80 with the detent 250 in the engaged position by moving the drill apparatus 100 in a direction opposite the cutting direction 910, i.e., in the removal direction 1010. The step of removing the cut pipe coupon 1050a,b of the pipe 80 from the pipe 80 can comprise contacting a wall of the cut pipe coupon 1050a,b with the shoulder 355a,b,357a,b defined by the ear 255a,b, 257a,b of the bar 260a,b.

The method can further comprise removing the ears 255a,b,257a,b of the bar 260a,b of the detent 250 by shearing or breaking the ears 255a,b,257a,b off at the shear line 301, which can be further facilitated by forming the bars 260a,b from plastic. Such removal of the ear 255a,b,257a,b can be accomplished without tools where, for example, no access to the detent 250 is possible by forcibly pulling the drilling apparatus 100 from the pipe 80 in the removal direction 1010, by rocking the drilling apparatus 100 at an angle with respect to the axis 901 with such force so as to shear off the ears 255a,b,257a,b, or by rotating the shell cutter 120 and the pilot drill 200—manually as needed—to cause the ears 255a,b,257a,b to experience loading sufficient to shear them off. Or a combination of these and other methods can be used. When access to the detent 250 is available through the clearance holes 128 or from the bottom of the shell cutter 120, one can either directly or with a tool push the detent 250 radially inwards towards the disengaged position and slide the coupons 1050a,b off. Upon breaking or shearing off of the ears 255a,b,257a,b, a new detent 250 can be easily installed in the pilot drill 200 and the pilot drill 20 and drilling apparatus 100 reused to drill into another pipe 80. As configured, the pilot drill 200 can be assembled to any one of a number of shell cutters 120 of different diameters and for use with different materials of the pipe 80 and various installation environments.

The bars 260a,b of the detent 250 can be made from a rigid material such as ultra-high-molecular-weight polyethylene (UHMW-PE) that is strong enough to catch and secure large pipe coupons such as the pipe coupons 1050a,b but also shear easily when needed and also not damage the pilot drill 200 upon removal.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pilot drill comprising:
    a shaft defining a longitudinal axis, the shaft further defining a detent cavity extending from an outer surface of the shaft towards the longitudinal axis and a fastener bore angled with respect to an extension direction of the detent cavity, the shaft comprising a cutting edge positioned proximate to the outer surface, the shaft configured to rotate about the longitudinal axis during use and thereby cut through a wall of a pipe;
    a detent comprising:
        a bar positioned at least partly within the detent cavity, the bar comprising a base and an ear and defining an opening extending from a first side to a second side proximate to a leading end of the bar; and
        a fastener extending through the fastener bore of the shaft and the opening of the bar and defining a pivot axis, the bar configured to rotate about the pivot axis from a disengaged position to an engaged position, the ear of the bar extending past the outer surface of the shaft with respect to the longitudinal axis when the bar is in the engaged position; and
        a biasing element positioned adjacent to the bar and at least partially within the detent cavity of the shaft, the biasing element being a torsion spring.

2. The pilot drill of claim 1, wherein the biasing element defines a V shape defining a valley, the valley positioned proximate to the pivot axis and a distal end of a leg of the torsion spring extending away from the leading end of the bar.

3. The pilot drill of claim 1, wherein the bar is a first bar, the detent further comprising a second bar, the detent cavity extending from each of opposite sides of the outer surface of the shaft relative to the longitudinal axis and towards the longitudinal axis, the biasing element positioned between the first bar and the second bar and configured to push each of the first bar and the second bar away from the longitudinal axis.

4. The pilot drill of claim 1, wherein the ear is a first ear, the bar further comprising a second ear extending past the outer surface of the shaft with respect to the longitudinal axis when the bar is in the engaged position, each of the first ear and the second ear defining a barbed shape.

5. The pilot drill of claim 4, wherein the first ear defines a first shoulder and a first ramp, the first shoulder positioned proximate to a trailing end of the bar and facing at least partly in a direction opposite from a cutting direction of the pilot drill and the first ramp extending from an outermost end of the first shoulder towards the leading end of the bar, the second ear defining a second shoulder facing at least partly in the direction opposite from the cutting direction of the pilot drill and a second ramp extending from an outermost end of the second shoulder towards the leading end of the bar.

6. The pilot drill of claim 1, wherein the bar defines a shear line at an intersection of the ear and the base of the bar.

7. The pilot drill of claim 6, wherein the shear line is a weakened portion defined in the first side of the bar.

8. The pilot drill of claim 1, wherein the fastener is a first fastener and the bar defines a trailing end distal from the leading end, the pilot drill further comprising a second fastener, the bar defining a second opening extending from the first side to the second side between the first opening and the trailing end, the second opening being a slot having a long dimension measured in a direction perpendicular to the longitudinal axis of the shaft, the second fastener extending through the shaft and the bar.

9. The pilot drill of claim 1, wherein the biasing element defines two legs and a transition portion joining the two legs.

10. The pilot drill of claim 1, wherein the biasing element further comprises two ends, a first end of the biasing element extending from and angled with respect to a first leg of the two legs and a second end of the biasing element extending from and angled with respect to a second leg of the two legs.

11. A drilling apparatus comprising:
    a pilot drill comprising:
        a shaft defining a longitudinal axis, the shaft further defining a detent cavity extending from an outer surface of the shaft towards the longitudinal axis and a fastener bore angled with respect to an extension direction of the detent cavity, the shaft comprising a cutting edge positioned proximate to the outer surface, the shaft configured to rotate about the longitudinal axis during use and thereby cut through a wall of a pipe; and a detent comprising:
  a bar positioned at least partly within the detent cavity, the bar comprising
    a base and an ear and defining
      a leading end and a trailing end distal from the leading end, and
      an opening extending from a first side to a second side proximate to the leading end; and
    a fastener extending through the fastener bore of the shaft and the opening of the bar and defining a pivot axis, the bar configured to rotate about the pivot axis from a disengaged position to an engaged position, the ear extending past the outer surface of the shaft with respect to the longitudinal axis when the bar is in the engaged position, the ear defining a barbed shape; and
  a biasing element positioned adjacent to the bar and at least partially within the detent cavity of the shaft, the biasing element being a torsion spring; and
  a shell cutter secured to and fixed with respect to the pilot drill, the shell cutter defining a leading end, a trailing end, and a wall; an inner surface of the wall of the shell cutter being offset from the outer surface of the shaft, the shell cutter configured to rotate together with the pilot drill about the longitudinal axis during use and thereby also cut through the wall of the pipe, the leading end of the shell cutter offset in an axial direction behind a tip of the pilot drill.

12. The drilling apparatus of claim 11, wherein the ear defines a shoulder and a ramp, the shoulder positioned proximate to the trailing end of the bar and facing at least partly in a direction opposite from a cutting direction of the pilot drill and the ramp extending from an outermost end of the shoulder towards the leading end of the bar.

13. The drilling apparatus of claim 11, wherein the pilot drill further comprises a biasing element positioned adjacent to the bar and at least partially within the detent cavity.

14. The drilling apparatus of claim 11, wherein the bar is a first bar, the detent further comprising a second bar, the detent cavity extending from each of opposite sides of the outer surface of the shaft relative to the longitudinal axis and towards the longitudinal axis.

15. The drilling apparatus of claim 11, wherein the bar defines a shear line at an intersection of the ear and the base of the bar, the shear line defined by a weakened portion in the first side of the bar.

16. The drilling apparatus of claim 11, wherein the fastener is a first fastener, the pilot drill further comprising a second fastener, the bar defining a second opening extending from the first side to the second side between the first opening and the trailing end, the second opening being a slot having a long dimension measured in a direction perpendicular to the longitudinal axis of the shaft, the second fastener extending through the shaft and the bar.

17. A method of using a drilling apparatus, the method comprising:
  rotating the drilling apparatus about a longitudinal axis of a shaft of a pilot drill of the drilling apparatus, the drilling apparatus comprising the pilot drill, the pilot drill comprising the shaft and a detent, the detent comprising a bar positioned at least partly within a detent cavity defined in the shaft, the bar configured to rotate about a pivot axis of the pilot drill from a disengaged position to an engaged position, the bar further defining a base and an ear, the ear extending past an outer surface of the shaft with respect to the longitudinal axis when the bar is in the engaged position, the ear defining a barbed shape beyond the outer surface of the shaft;
  forming a pilot hole in a wall of a pipe with the pilot drill;
  passing the detent of the pilot drill through the wall of the pipe with the detent in the disengaged position;
  pushing the bar away from the longitudinal axis with a biasing element, the biasing element being a torsion spring; and
  removing a cut pipe coupon of the pipe from the pipe with the detent in the engaged position by moving the drill apparatus in a direction opposite the cutting direction, a biasing element moving the detent from the disengaged position to the engaged position, the pilot drill defining an overall diameter measuring greater than a diameter of the pilot hole with the detent in the engaged position.

18. The method of claim 17, wherein removing the cut pipe coupon of the pipe from the pipe comprises contacting a wall of the cut pipe coupon with a shoulder defined by the ear of the bar.

19. The method of claim 17, wherein the bar defines a shear line at an intersection of the ear and the base of the bar, the shear line defined by a weakened portion in a first side of the bar.

20. The method of claim 19, further comprising removing the ear of the detent by shearing the ear off at the shear line.

21. The method of claim 17, wherein the biasing element defines two legs and a transition portion joining the two legs.

22. A pilot drill comprising:
  a shaft defining a longitudinal axis, the shaft further defining a detent cavity extending from an outer surface of the shaft towards the longitudinal axis and a fastener bore angled with respect to an extension direction of the detent cavity, the shaft comprising a cutting edge positioned proximate to the outer surface, the shaft configured to rotate about the longitudinal axis during use and thereby cut through a wall of a pipe; and
  a detent comprising:
    a bar positioned at least partly within the detent cavity, the bar comprising a base and an ear and defining an opening extending from a first side to a second side proximate to a leading end of the bar, the bar defining a shear line at an intersection of the ear and the base of the bar; and
    a fastener extending through the fastener bore of the shaft and the opening of the bar and defining a pivot axis, the bar configured to rotate about the pivot axis from a disengaged position to an engaged position, the ear of the bar extending past the outer surface of the shaft with respect to the longitudinal axis when the bar is in the engaged position.

23. The pilot drill of claim 22, wherein the shear line is a weakened portion defined in the first side of the bar.

24. A pilot drill comprising:
  a shaft defining a longitudinal axis, the shaft further defining a detent cavity extending from an outer surface of the shaft towards the longitudinal axis and a fastener bore angled with respect to an extension direction of the detent cavity, the shaft comprising a cutting edge positioned proximate to the outer surface, the shaft configured to rotate about the longitudinal axis during use and thereby cut through a wall of a pipe; and
  a detent comprising:
    a bar positioned at least partly within the detent cavity, the bar comprising a base and an ear and defining a first opening extending from a first side to a second side proximate to a leading end of the bar, the bar defining a trailing end distal from the leading end, the bar defining a second opening extending from the first side to the second side between the first opening and the trailing end, the second opening being a slot having a long dimension measured in a direction perpendicular to the longitudinal axis of the shaft;

a first fastener extending through the fastener bore of the shaft and the first opening of the bar and defining a pivot axis, the bar configured to rotate about the pivot axis from a disengaged position to an engaged position, the ear of the bar extending past the outer surface of the shaft with respect to the longitudinal axis when the bar is in the engaged position; and a second fastener extending through the shaft and the second opening of the bar.

25. A method of using a drilling apparatus, the method comprising:

rotating the drilling apparatus about a longitudinal axis of a shaft of a pilot drill of the drilling apparatus, the drilling apparatus comprising the pilot drill, the pilot drill comprising the shaft and a detent, the detent comprising a bar positioned at least partly within a detent cavity defined in the shaft, the bar configured to rotate about a pivot axis of the pilot drill from a disengaged position to an engaged position, the bar further defining a base and an ear, the ear extending past an outer surface of the shaft with respect to the longitudinal axis when the bar is in the engaged position, the ear defining a barbed shape beyond the outer surface of the shaft, the bar further defining a shear line at an intersection of the ear and the base of the bar, the shear line defined by a weakened portion in a first side of the bar;

forming a pilot hole in a wall of a pipe with the pilot drill;

passing the detent of the pilot drill through the wall of the pipe with the detent in the disengaged position; and removing a cut pipe coupon of the pipe from the pipe with the detent in the engaged position by moving the drill apparatus in a direction opposite the cutting direction, a biasing element moving the detent from the disengaged position to the engaged position, the pilot drill defining an overall diameter measuring greater than a diameter of the pilot hole with the detent in the engaged position.

26. The method of claim 25, further comprising removing the ear of the detent by shearing the ear off at the shear line.

* * * * *